(12) United States Patent
Chen

(10) Patent No.: US 10,800,483 B2
(45) Date of Patent: Oct. 13, 2020

(54) CLEAT FOR RACING BICYCLE SHOE

(71) Applicant: Yong-Fu Chen, Taichung (TW)

(72) Inventor: Yong-Fu Chen, Taichung (TW)

(73) Assignee: SCADA INTERNATIONAL CO., LTD., Taichung (TW)

( * ) Notice: Subject to any disclaimer, the term of this patent is extended or adjusted under 35 U.S.C. 154(b) by 188 days.

(21) Appl. No.: 16/137,732

(22) Filed: Sep. 21, 2018

(65) Prior Publication Data

US 2020/0094915 A1    Mar. 26, 2020

(51) Int. Cl.
*B62M 3/08* (2006.01)
*A43B 5/14* (2006.01)

(52) U.S. Cl.
CPC ............... *B62M 3/086* (2013.01); *A43B 5/14* (2013.01)

(58) Field of Classification Search
CPC .................................. B62M 3/086; A43B 5/14
See application file for complete search history.

(56) References Cited

U.S. PATENT DOCUMENTS

| | | | | |
|---|---|---|---|---|
| 4,827,797 A * | 5/1989 | Le Faou | ................ | B62M 3/086 36/131 |
| 4,893,420 A * | 1/1990 | Bezin | ................ | A43B 5/14 36/131 |
| 5,048,369 A * | 9/1991 | Chen | ................ | B62M 3/086 74/594.6 |
| 5,199,192 A * | 4/1993 | Kilgore | ................ | A43B 5/14 36/131 |
| 5,363,573 A * | 11/1994 | Kilgore | ................ | A43B 5/14 36/131 |
| 5,381,708 A * | 1/1995 | Liao | ................ | B62M 3/086 36/131 |
| 6,612,201 B1 * | 9/2003 | Chen | ................ | B62M 3/08 74/594.4 |
| 8,453,353 B2 * | 6/2013 | Xie | ................ | A43B 5/14 36/131 |
| 8,646,359 B2 * | 2/2014 | Hsieh | ................ | B62M 3/086 74/594.6 |
| 2005/0188567 A1 * | 9/2005 | Chretien | ................ | A43B 5/14 36/131 |
| 2007/0094898 A1 * | 5/2007 | Xie | ................ | A43B 5/14 36/131 |
| 2013/0312569 A1 * | 11/2013 | Hsieh | ................ | B62M 3/086 74/594.6 |
| 2020/0094915 A1 * | 3/2020 | Chen | ................ | A43B 5/14 |

* cited by examiner

*Primary Examiner* — Vicky A Johnson

(57) ABSTRACT

Disclosed is a cleat with an adjustable pad. The cleat includes a cleat body, an anti-slip buffer and a support base. The cleat body has three fixing holes and a central hole among the three fixing holes. A top side of the central hole is formed with a recess. The recess has a front portion and a rear portion. The central is located in the front portion. The anti-slip buffer is of a hat shape corresponding to the central hole and capable of selectively being placed in the central hole in different directions to form two protrudent heights. The support base is of a shape corresponding to the recess and capable of selectively being placed in the recess in different directions to adjustably support the anti-slip buffer.

9 Claims, 9 Drawing Sheets

CLEAT FOR RACING BICYCLE SHOE

BACKGROUND OF THE INVENTION

1. Technical Field

This invention relates generally to cleat assemblies configured for releasable securement to pedals for bicycles, particularly, to cleat assemblies with an anti-slip pad.

2. Related Art

Clipless pedals (also known as "clip-in" or "step-in" pedals) require a cleat fitted to the sole of a rider's shoe, which locks to the pedal and thus holds the shoe firmly to the pedal. Clipless pedals take a variety of forms and are typically adapted for the demands of a particular type of cycling, such as road cycling and off-road or mountain biking.

A cleat for road cycling is a substantially triangular plate with three fixing holes. The cleat is fastened onto a sole of a bike shoe by three screws separately passing through the fixing holes. A front tip and a rear end of the cleat are engaged with a front blocker and a rear hook of a clipless pedal, respectively. Because both the cleat and the clipless pedal are made of hard material, there must be gaps formed between the cleat and the pedal to cause shakes. Thus, some manufactures add a pad among the fixing holes to compensate the gaps and make an anti-slip effect. However, such a pad is a protrusion with a single thickness. In other words, the pad can generate only one compensatory effect without adjustability.

SUMMARY OF THE INVENTION

An object of the invention is to provide a cleat for a racing bicycle shoe, which has an adjustable anti-slip buffer to compensate gaps between a pedal and the cleat and provide an adjustable buffering strength.

Another object of the invention is to provide a cleat for a racing bicycle shoe, whose adjustable anti-slip buffer can extend service life by selectively adjustment.

To accomplish the above object, the cleat of the invention includes a cleat body, an anti-slip buffer and a support base. The cleat body has three fixing holes and a central hole among the three fixing holes. A top side of the central hole is formed with a recess. The recess has a front portion and a rear portion. The central is located in the front portion. The anti-slip buffer is of a hat shape corresponding to the central hole and capable of selectively being placed in the central hole in different directions to form two protrudent heights. The support base is of a shape corresponding to the recess and capable of selectively being placed in the recess in different directions to adjustably support the anti-slip buffer.

DETAILED DESCRIPTION OF THE INVENTION

Specific, non-limiting embodiments of the present invention will now be described with reference to the drawings. It should be understood that such embodiments are by way of example only and merely illustrative of but a small number of embodiments within the scope of the present invention. Various changes and modifications obvious to one skilled in the art to which the present invention pertains are deemed to be within the spirit, scope and contemplation of the present invention as further defined in the appended claims.

With reference now to the illustrative drawings, various embodiments of a cleat are described and shown. The cleats described herein are designed to be secured to the underside of the sole of a rider's shoe (not shown), and are configured to be attachable to a pedal.

In the following description, the term "front" means a direction toward the toe of a rider's shoe, the term "rear" means a direction toward the heel of a rider's shoe, the term "outer" means a direction which is opposite to an arch of a rider's shoe, the term "inner" means a direction toward an arch of a rider's shoe, the term "top side" means a side facing a sole of a rider's show, and the term "bottom side" means a side facing a pedal. These terms are also available in claims.

Figure 1:
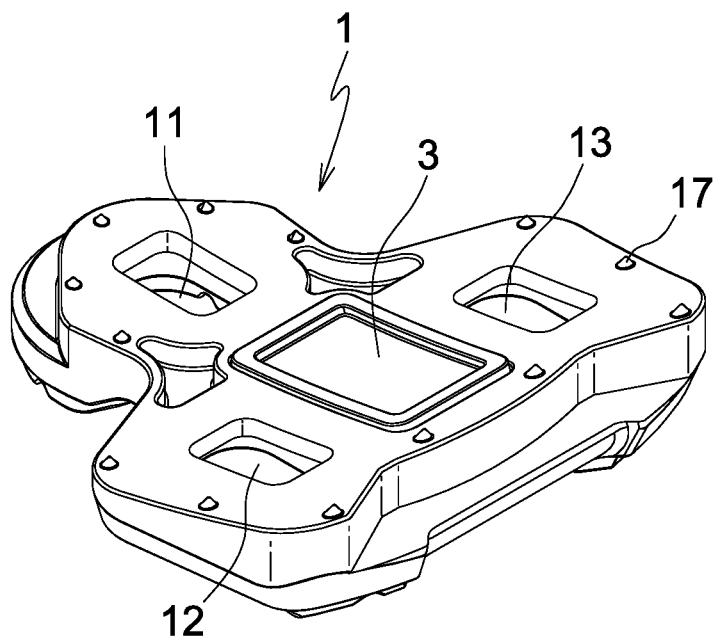
FIG. 1 is a perspective view of the invention.
Figure 2:
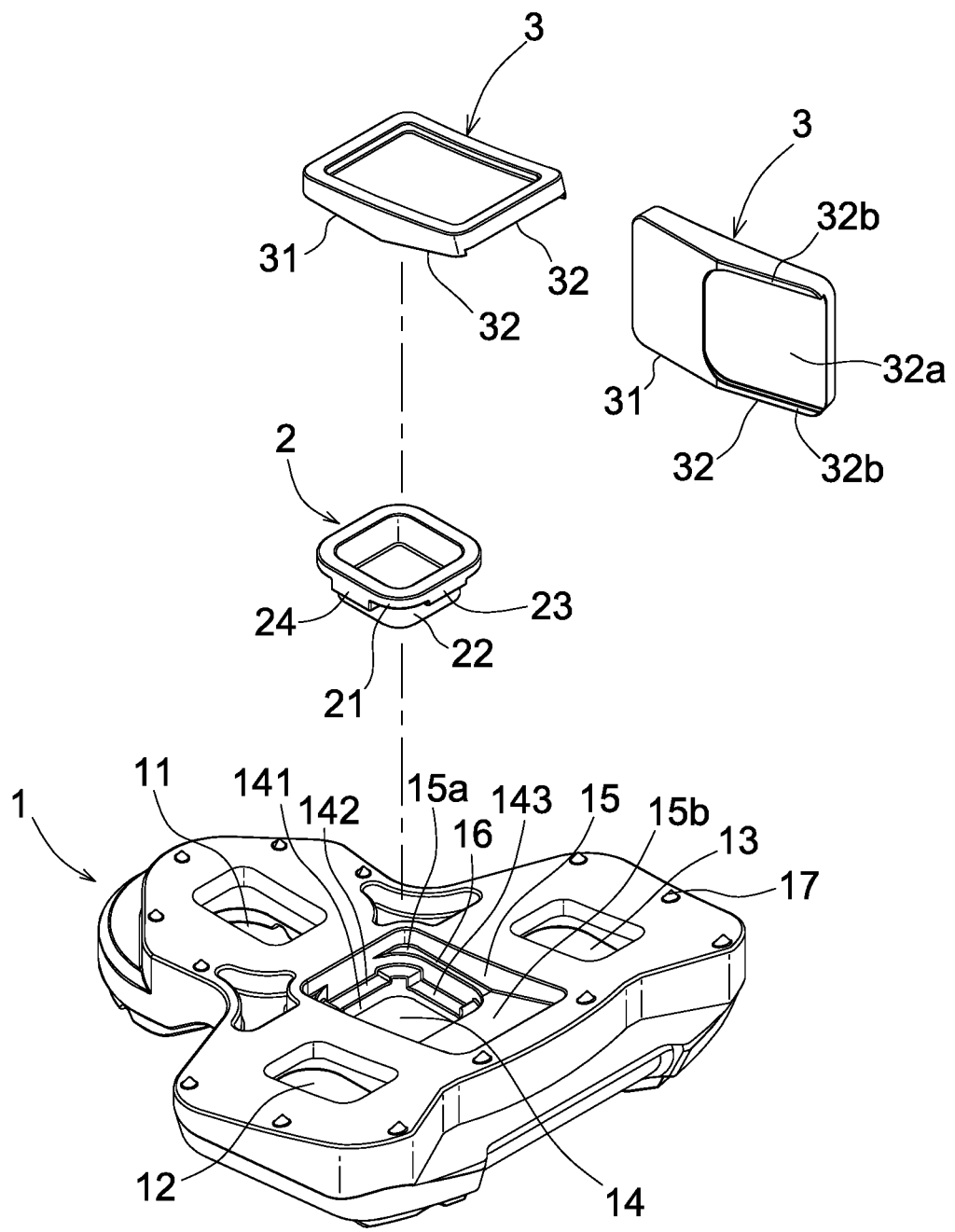
FIG. 2 is an exploded view of the invention.

Please refer to FIGS. 1 and 2. The cleat of the invention includes a cleat body 1, an anti-slip buffer 2 and a support base 3. The cleat body 1 is substantially triangular and has three fixing holes 11, 12, 13 and a central hole 14 among the three fixing holes 11, 12, 13. Both the anti-slip buffer 2 and support base 3 are put in the central hole 14 and the anti-slip buffer 2 slightly protrudes from the bottom side 10 of the cleat body 1.

Figure 3:
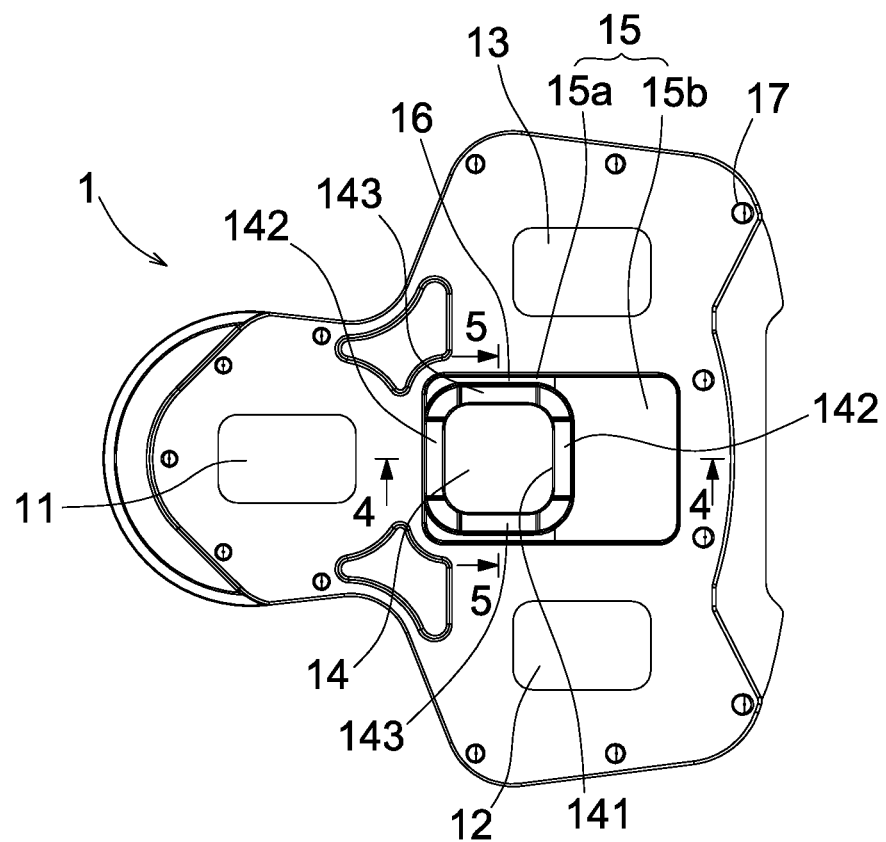
FIG. 3 is a top view of the cleat body of the invention.
Figure 4:
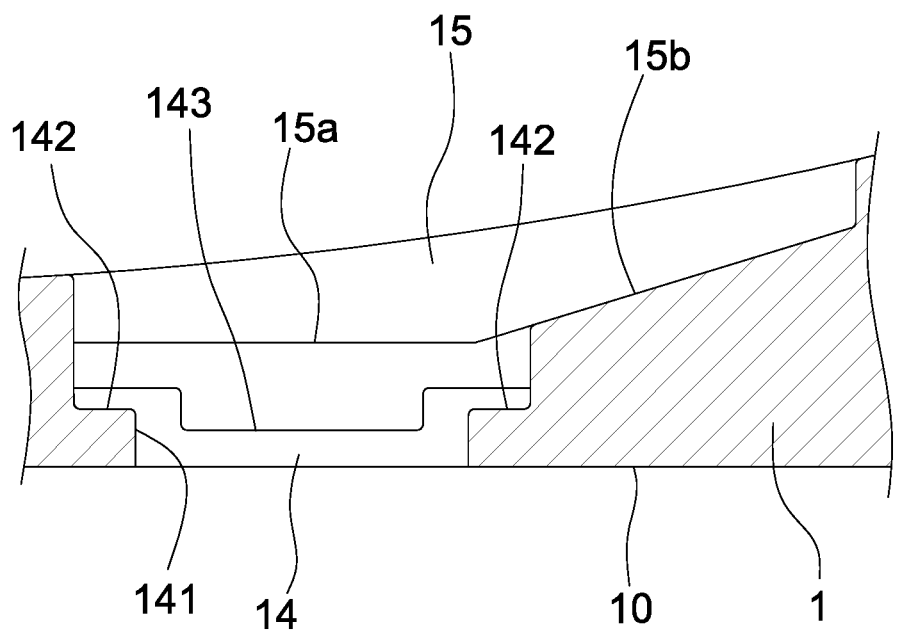
FIG. 4 is a cross-sectional view along line 4-4 in FIG. 3.
Figure 5:
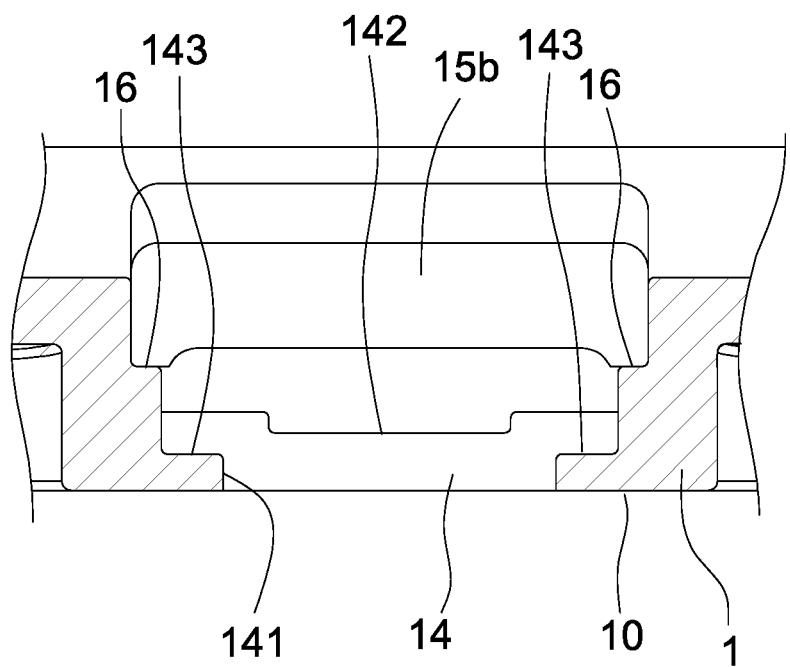
FIG. 5 is a cross-sectional view along line 5-5 in FIG. 3.

Please refer to FIGS. 3-5. The central hole 14 is a square through hole. A bottom end of the central hole 14 is inward formed with a flange 141. A top surface of each of a front side and a rear side of the flange 141 is formed with a first notch 142 with the same depth, a top surface of each of a left side and a right side of the flange 141 is formed with a second notch 143 with the same depth, and the depths of the first notch 142 and the second notch 143 are different. In the shown embodiment, the first notches 142 are less than the second notches 143 in depth. A top end of the central hole 14 is formed with a rectangular recess 15. The recess 15 is divided into a front portion 15a and a rear portion 15b. The bottom of the rear portion 15b is a slant rearward and upward from the front portion 15a. The central hole 14 is located in the front portion 15a. A front edge of the central hole 14 is flush with that of the front portion 15a, two lateral edges of the central hole 14 is narrower those of the front portion 15a to form a step 16 on each edge, and a rear edge of the central hole 14 is approximately located at the junction of the front and rear portions 15a, 15b. Four corners of each of the central hole 14 and the flange 141 are arced angles.

Figure 6:
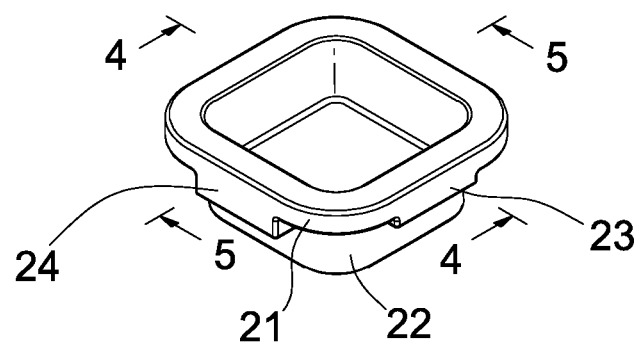
FIG. 6 is a perspective view of the anti-slip buffer of the invention.
Figure 7:
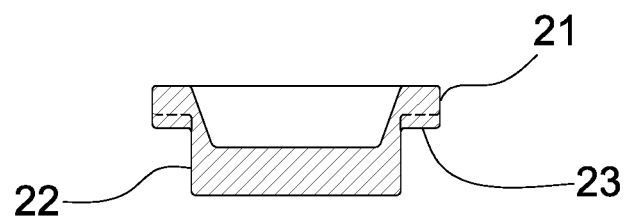
FIG. 7 is a cross-sectional view along line 7-7 in FIG. 6.
Figure 8:
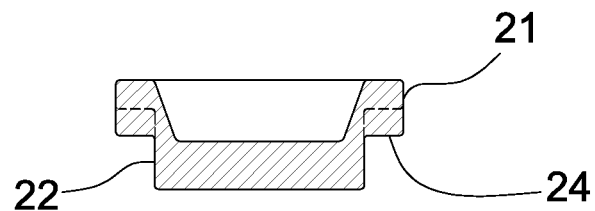
FIG. 8 is a cross-sectional view along line 8-8 in FIG. 6.
Figure 9:
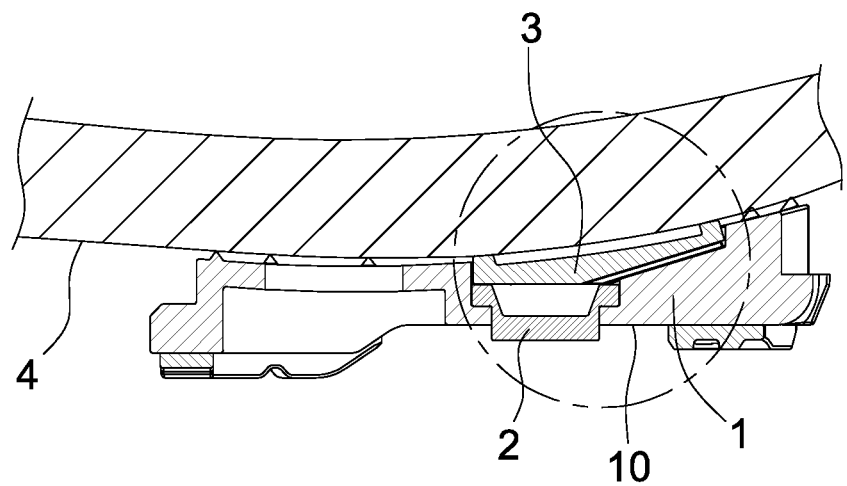
FIG. 9 is a cross-sectional view of the invention fastened onto a sole.
Figure 10:
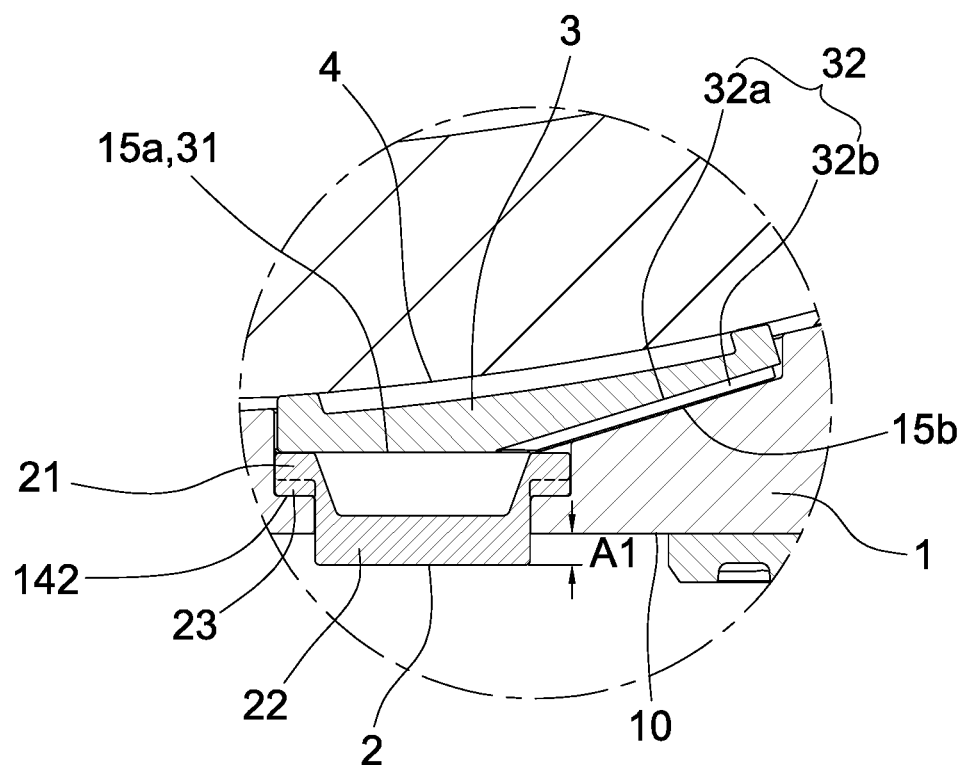
FIG. 10 is a partially enlarged view of FIG. 9.
Figure 11:
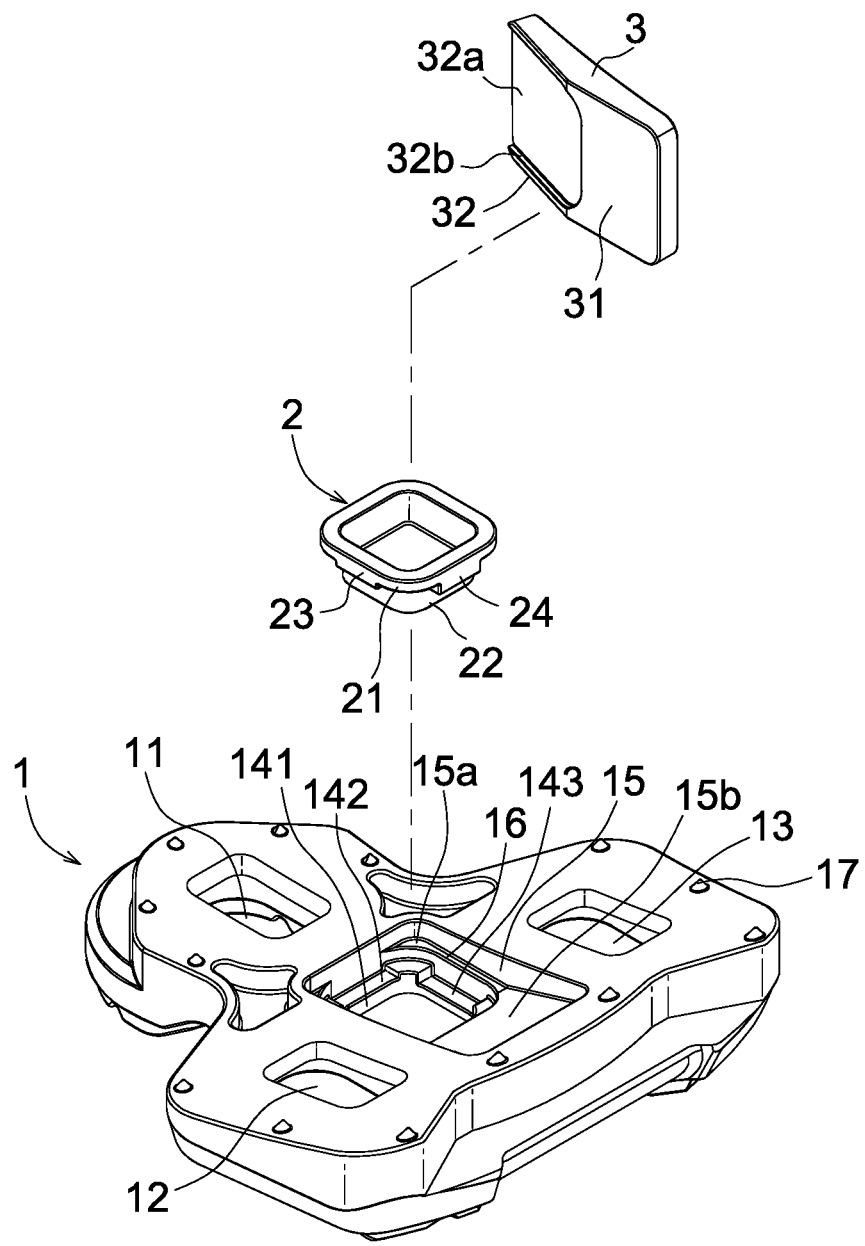
FIG. 11 is an exploded view of the invention in another status.
Figure 12:
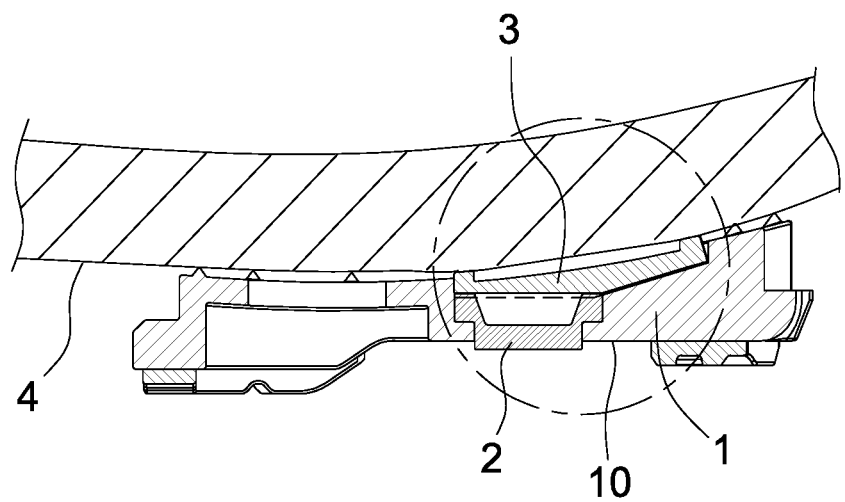
FIG. 12 is a cross-sectional view of the invention fastened onto a sole in the status of FIG. 11.
Figure 13:
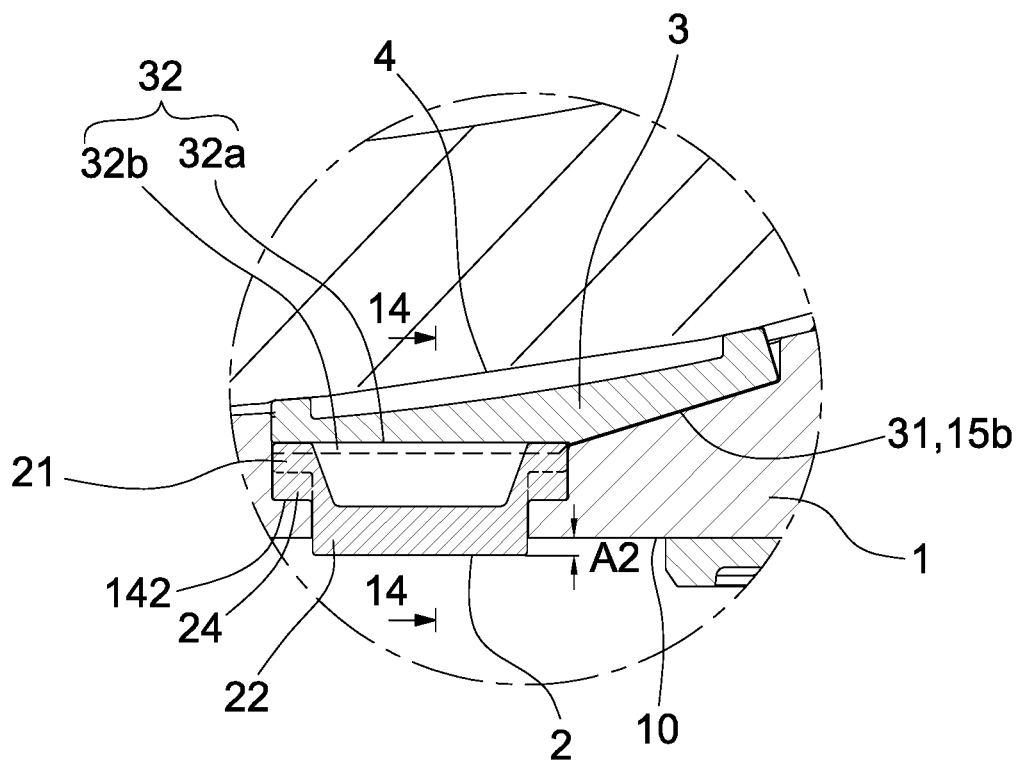
FIG. 13 is a partially enlarged view of FIG. 12.

Please refer to FIGS. 6-8. The anti-slip buffer 2 is of a square hat shape corresponding to the central hole 14. A top side of the anti-slip buffer 2 is formed with a brim 21 corresponding to the central hole 14 in shape, and a bottom side of the anti-slip buffer 2 is a protrusion 22 whose size is slightly smaller than that of the aperture enclosed by the flange 141. Four sides of the brim 21 are separately downward extended with two first blocks 23 corresponding to the first notches 142 and two second blocks 24 corresponding to the second notches 143. The first blocks 23 are less than the second blocks 24 in height. When the anti-slip buffer 2 is inserted into the central hole 14, the first blocks 23 and the second blocks 24 engage with the first notches 142 and the second notches 143, respectively. As a result, the anti-slip buffer 2 passes through the central hole 14 and protrudes from the bottom side 10 of the cleat body 1 to form a large protrudent height A1 as shown in FIGS. 9 and 10, and the top side of the brim 21 is flush with the top edge of the central hole 14.

Figure 14:
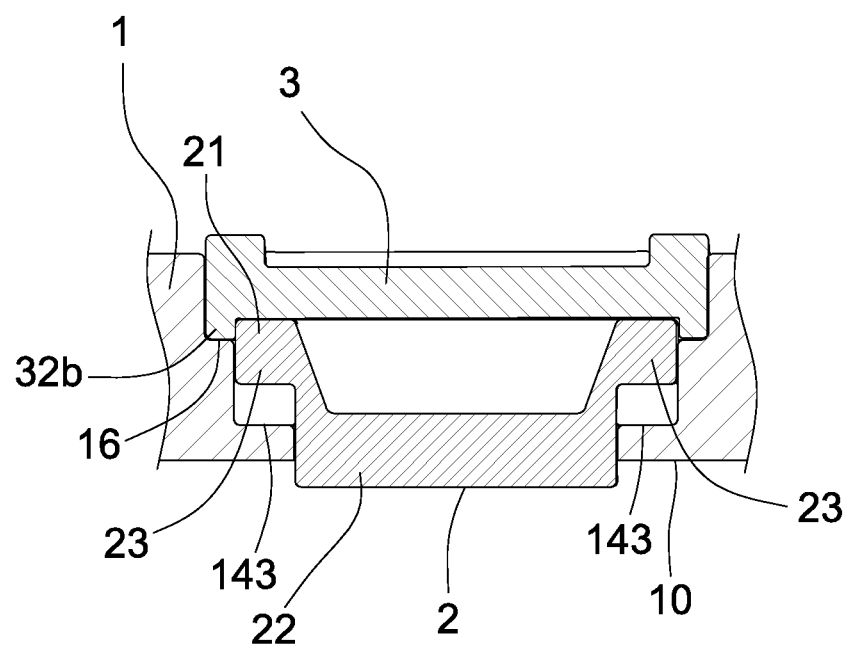
FIG. 14 is a cross-sectional view along line 14-14 in FIG. 13.

Please refer back to FIG. 1. The support base 3 is formed into a shape corresponding to the recess 15 atop the central hole 14. The bottom of the support base 3 corresponds the recess 15 to form a first slope 31 and a second slope 32. In this embodiment, the top side of the cleat body 1 is formed with bumps 17 to enhance engagement with a sole 4. When the support base 3 is placed in the recess 15, its top surface slightly protrudes from the top side of the cleat body 1 to be in contact with a sole 4. The second slope 32 is formed with an indent 32a for receiving the brim 21. Two side bars 32b of the indent 32a correspond to the steps 16. Please refer to FIGS. 11-14, which show another status of the invention. When the anti-slip buffer 2 is rotated 90 degrees, the first blocks 23 and the second blocks 24 engage with the second notches 143 and the first notches 142, respectively. Because the higher second blocks 24 engage with the flatter first notches 142, the anti-slip buffer 2 in the central hole 14 will shrink back to form a small protrudent height A2. Also, the brim 21 slightly protrudes from the top edge of the central hole 14. At this time, the support base 3 can be longitudinally reversed to make the brim 21 received in the indent 32a, and the side bars 32b are supported by the steps 16 as shown in FIG. 14. As a result, the support base 3 can be attached with the sole 4.

It is noted that when the anti-slip buffer 2 has been used with the small protrudent height A2 for a long time to be worn down, a user may rotate the anti-slip buffer 2 to make another protrudent height. This can extent service life of the anti-slip buffer 2.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A cleat for a racing bicycle shoe, comprising:
    a cleat body, having three fixing holes and a central hole among the three fixing holes, a top side of the central hole being formed with a recess, the recess having a front portion and a rear portion, and the central hole being located in the front portion;
    an anti-slip buffer, being of a hat shape corresponding to the central hole, and being capable of selectively being placed in the central hole in different directions to form two protrudent heights; and
    a support base, being of a shape corresponding to the recess, and being capable of selectively being placed in the recess in different directions to adjustably support the anti-slip buffer.

2. The cleat of claim 1, wherein the central hole is a square through hole, a bottom end of the central hole is inward formed with a flange, a top surface of each of a front side and a rear side of the flange is formed with a first notch with the same depth, a top surface of each of a left side and a right side of the flange is formed with a second notch with the same depth, and the depths of each first notch and each second notches are different.

3. The cleat of claim 2, wherein the first notches are less than the second notches in depth.

4. The cleat of claim 2, wherein the anti-slip buffer is of a square hat shape, a top side of the anti-slip buffer is formed with a brim corresponding to the central hole in shape, a bottom side of the anti-slip buffer is a protrusion passing an aperture enclosed by the flange, four sides of the brim are separately downward extended with two first blocks corresponding to the first notches and two second blocks corresponding to the second notches, and the first blocks are less than the second blocks in height.

5. The cleat of claim 4, wherein when the first blocks and the second blocks engage with the first notches and the second notches, respectively, the anti-slip buffer protrudes from a bottom side of the cleat body to form a first protrudent height, when the first blocks and the second blocks engage with the second notches and the first notches, respectively, and the anti-slip buffer in the central hole will shrink back to form a second protrudent height.

6. The cleat of claim 1, wherein the recess is divided into a front portion and a rear portion, a bottom of the rear portion is a slant rearward and upward from the front portion, a front edge of the central hole is flush with that of the front portion, two lateral edges of the central hole is narrower those of the front portion to form a step on each edge, and a rear edge of the central hole is approximately located at a junction of the front and rear portions.

7. The cleat of claim 6, wherein a bottom of the support base corresponds the recess to form a first slope and a second slope.

8. The cleat of claim 7, wherein the second slope is formed with an indent, and two side bars of the indent correspond to the two steps.

9. The cleat of claim 1, wherein a top side of the cleat body 1 is formed with bumps.

\* \* \* \* \*